E. M. Davis,

Label.

No 3637. Reissued Sept 14. 1869

Witnesses.
R. J. Campbell
A. Hoermann.

Inventor.
Edward M. Davis
by
Mann, Fennell & Lemaire

UNITED STATES PATENT OFFICE.

HENRY H. COLLINS, BENJAMIN F. COLLINS, AND HOMER WRIGHT, OF PITTSBURG, PENNSYLVANIA, ASSIGNEES OF EDWARD M. DAVIS.

IMPROVEMENT IN FRUIT-JARS.

Specification forming part of Letters Patent No. 83,367, dated October 27, 1868; Reissue No. 3,637, dated September 14, 1869.

*To all whom it may concern:*

Be it known that EDWARD M. DAVIS, of Pittsburg, in the county of Allegheny and State of Pennsylvania, did invent an Improvement in Fruit Jars and Cans, which improvement was assigned in full to HENRY H. COLLINS, BENJAMIN F. COLLINS, and HOMER WRIGHT, of the same place, and Letters Patent issued to the said HENRY H. and BENJAMIN F. COLLINS and WRIGHT bearing date on the 27th day of October, 1868; and we hereby declare that the following is a more full, clear, and exact description of the said improvement, reference being had to the accompanying drawings, making part of this specification, in which—

Figure 1:
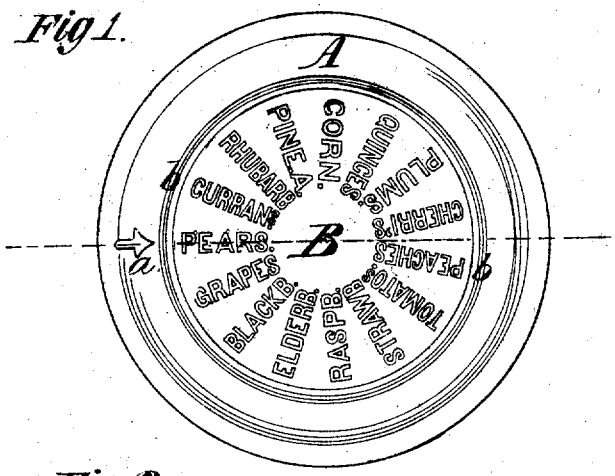
Figure 2:
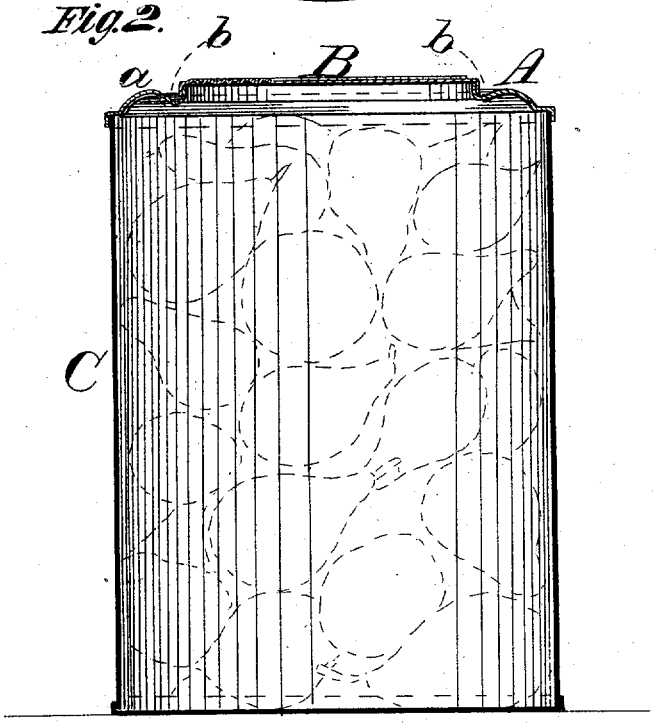
Figure 3:
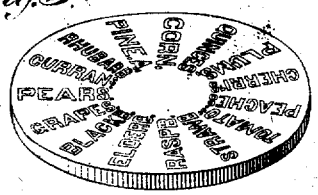

Figure 1 is a top view of a preserve-can, showing one mode of applying the improvement to it. Fig. 2 is a diametrical section through the can. Fig. 3 is a perspective view of a can-top having a series of names of fruits imprinted upon it.

Similar letters of reference indicate corresponding parts in the several figures.

The object of this invention is to afford means for readily ascertaining the kind of fruit or other substance sealed in a can or jar, so that no mistake need be made in opening the same.

The invention consists, first, in stamping, printing, or otherwise permanently affixing a series of the names of different kinds of fruits, chemicals, or other substances upon the cover or the body of a preserve can or vessel; and, second, in employing in combination with such series of names an indicator, which will signify the character of the contents of the can or jar when sealed.

The following is a description of one practical mode of carrying this invention into effect.

The drawings Figs. 1 and 2 represent the invention applied to a metallic preserve-can; but it is obvious that the invention is applicable to cans, jars, or other preserve-vessels made of glass, earthenware, or other substance, and made of different shapes.

A is the ring which constitutes the top of the cylindrical body C of the can, and which is made with an annular flange or lip by turning up its inner edge, as shown in Fig. 2.

B is the cover, which has its outer edge turned so as to fit snugly upon the annular lip of the top ring, A, and admit of being secured in place by cement or solder put into the annular cavity *b*. This is an old and well-known mode of constructing metallic preserve-cans.

In connection with the can an impression or indentation, or a simple dot or other mark, will serve as an index, or the foundation for an index, which dot, mark, impression, or index is used opposite or adjacent to the name of the contents of the can to signify its contents when sealed. In the drawings the names are represented upon the top B of the can and the indicator in the similitude of an arrow adjacent to the word "Pears," thus signifying this fruit to be contained in the can.

It is preferred to have the names of the different kinds of fruits or other substances to be sealed arranged upon the cover or top B, either as shown or in any other suitable manner; but, if desired, the names may be made upon the body of the can or jar.

Having described one practical mode of carrying out this invention, what we claim as new is—

1. A preserve jar or can having a series of names of articles thereon, one or the other of which is intended to be sealed therein, and used in connection with an indicator to designate the particular fruit or article of said series when sealed in said jar or can, substantially as described.

2. As a new article of manufacture, a preserve jar or can top having a series of names thereon to designate the articles intended to be sealed or preserved, substantially as described.

HENRY H. COLLINS.
BENJAMIN F. COLLINS.
HOMER WRIGHT.

Witnesses:
C. HASBROUCK,
B. C. CHRISTY.